Dec. 24, 1968 W. M. HICKEY 3,417,857
MATERIAL HANDLING APPARATUS AND METHOD
Filed Sept. 9, 1966 4 Sheets-Sheet 1
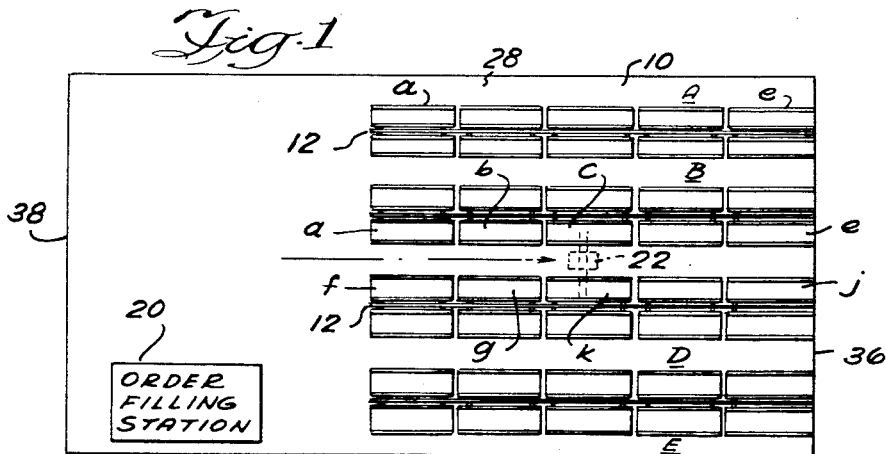
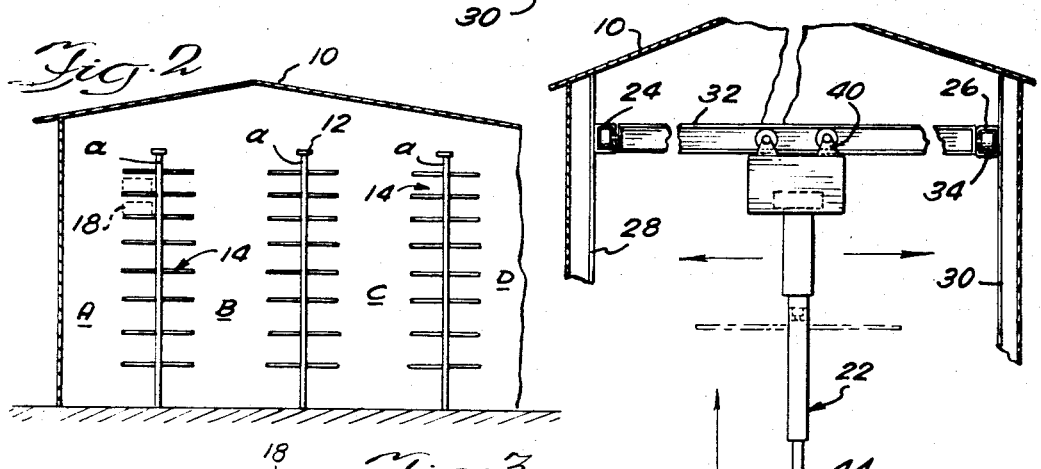
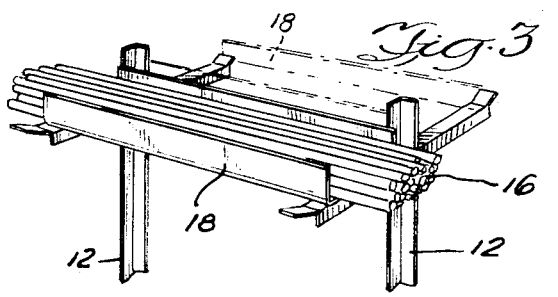
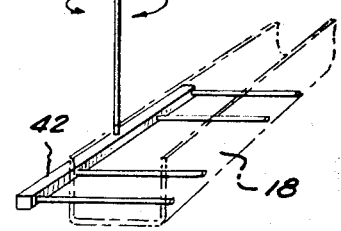
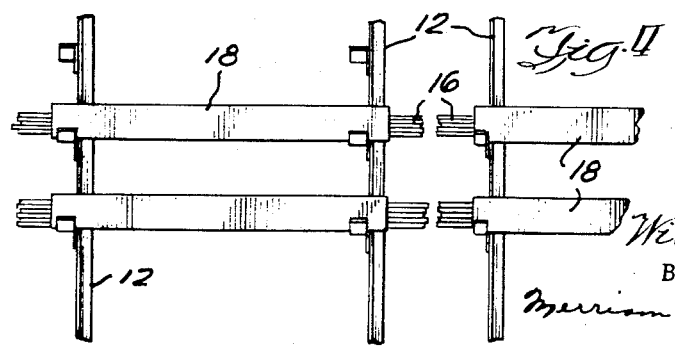
INVENTOR.
William M. Hickey
BY
Merriam, Marshall, Shapiro & Klose
ATTORNEYS

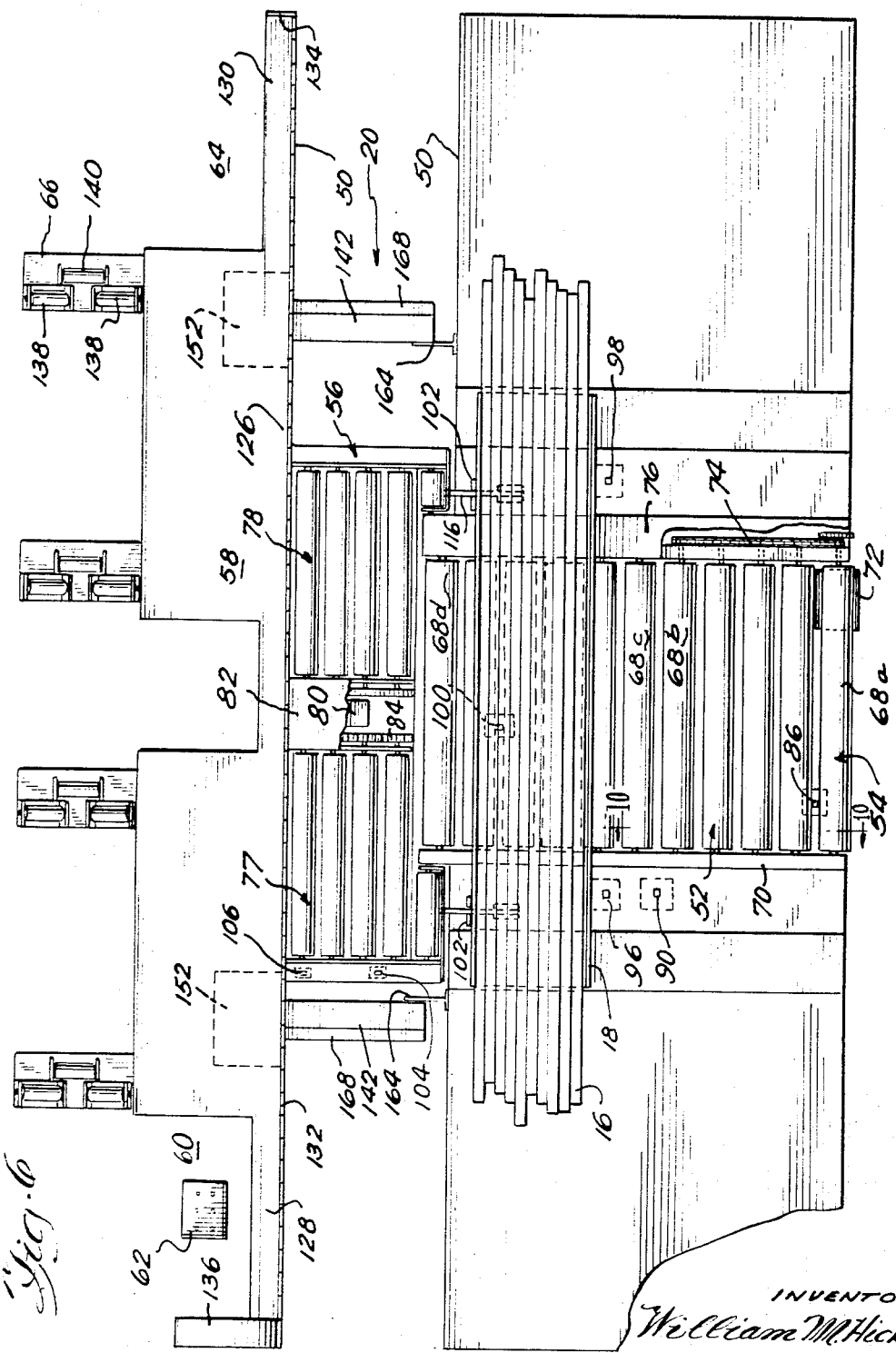

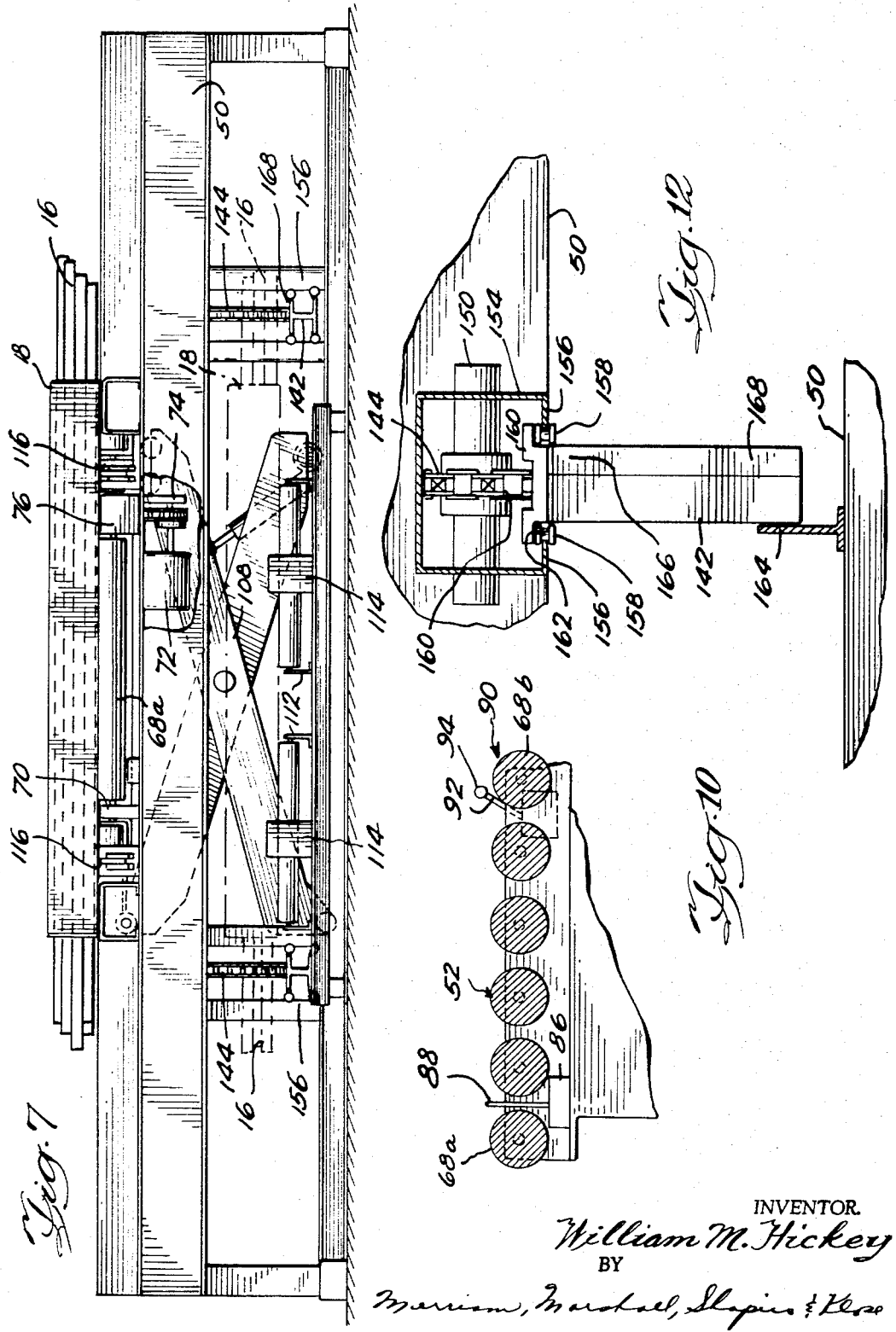

Dec. 24, 1968 W. M. HICKEY 3,417,857
MATERIAL HANDLING APPARATUS AND METHOD
Filed Sept. 9, 1966 4 Sheets-Sheet 4
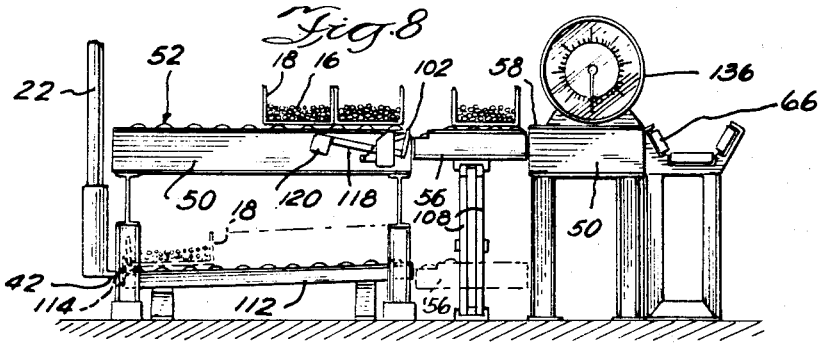
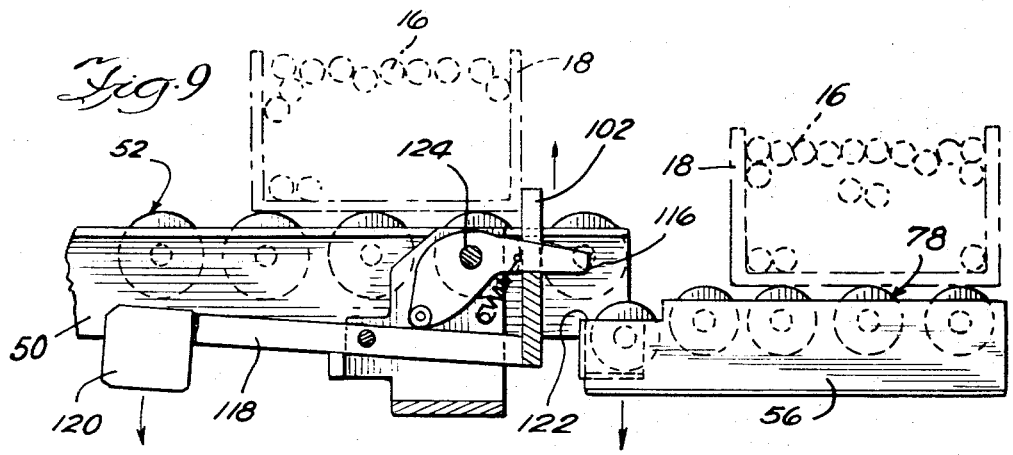
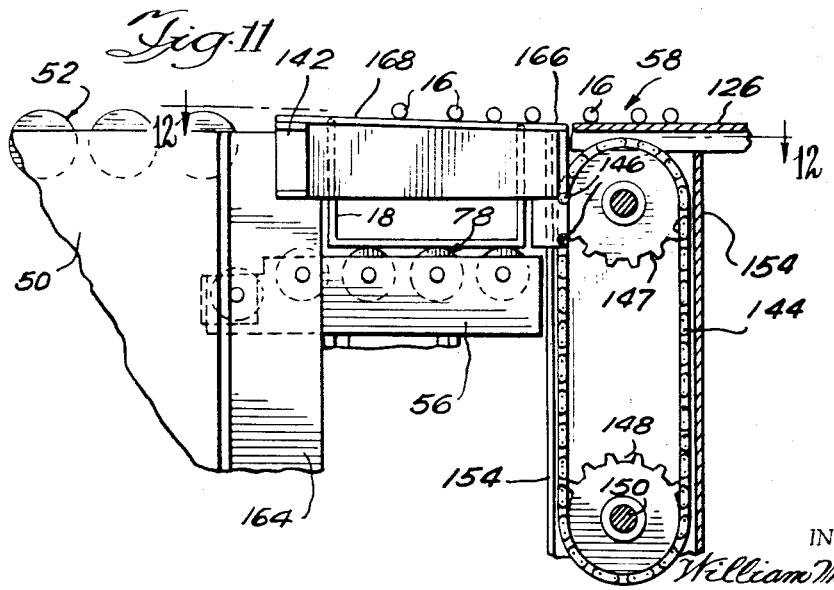
INVENTOR.
William M. Hickey
BY
Merriam, Marshall, Shapiro & Klose
ATTORNEYS

United States Patent Office 3,417,857
Patented Dec. 24, 1968

3,417,857
MATERIAL HANDLING APPARATUS
AND METHOD
William M. Hickey, Chicago, Ill., assignor to Lapham-Hickey Steel Corp., Chicago, Ill., a corporation of Illinois
Filed Sept. 9, 1966, Ser. No. 578,339
9 Claims. (Cl. 198—39)

ABSTRACT OF THE DISCLOSURE

A material handling apparatus for transferring articles such as metal rods, tubes, or other elongated articles to an operator so that orders for the articles can be readily filled by the operator, the apparatus including a power driven conveyor to controllably move the articles from a receiving position to a manual handling position, and a vertically moving table for supporting and transferring the articles. A pair of stripper bars are movably mounted adjacent the table and means are provided for controlling the lowering of the table and raising of the stripper bars so that a desired number of articles can be removed by the operator when filling orders. The vertically moving table also includes a reversible conveyor for moving the articles towards the pickup position with the table in the raised position and for transferring the articles from the table for return to storage with the table in the lowered position.

---

This invention relates to material handling apparatus useful for order filling and more particularly to apparatus and a method for moving elongated articles such as tubing from storage to and through an order filling station.

Although the present invention will be discussed and illustrated in terms of its application to the steel industry, it must be understood that it is contemplated that the teachings herein are applicable to any instance in which large, elongated and heavy articles are to be transferred during an order filling procedure. In the steel industry, the procedure now used for filling orders of steel stock is very time consuming. Generally, the steel stock consists of different lengths and cross-sections of bars, rods, tubing, etc., which are stored in individual storage bins throughout a large warehouse. When an order is to be filled, the order filler must go to each of the respective storage bins containing the stock desired. At each bin, the required number of pieces is extracted from the bin to total the particular length of stock ordered. In most cases, the stock is of varying length so that the order filler must remove and measure each individual piece of stock. Sometimes the order filler will remove the complete stock in the particular bin, pick out and measure certain pieces until the total length has been obtained and place the remaining stock in the bin.

In most instances, the order consists of more than one item of stock. Thus, the order filler must move the stock of the first ordered item to the location of the storage bin of the next ordered item to select the particular pieces of stock required in connection with this item. This procedure continues in a cumulative manner until all of the ordered items have been obtained. The order filler then moves the entire order to a weighing and shipping station where the stock is weighed and securely fastened for shipment. In an alternative manner, the order filler can drop off each of the items in a multiple item order at the weighing station as he completes each item. In this procedure, the order filler must return to the storage area each time to select the next ordered item. As can be seen from the above general description of the procedures used heretofore in filling orders of steel stock, these procedures are time consuming and expensive. Such procedures for transferring articles for order filling have been previously thought to be necessary due to the relatively large size of such stock, the awkwardness encountered when attempting to mechanically transfer stock of varying cross-section and length, and the relatively heavy weight of such stock.

In accordance with the present invention, there is contemplated an apparatus which can readily transfer the articles to the order filler at an order filling position such that the order filler can quickly select the stock required.

In one aspect illustrating the principles of the present invention, the apparatus includes a frame with a receiving position for receiving the articles and an order filling position at which an operator is situated for selecting the articles for filling the orders. A power-driven conveyor in the frame transfers the articles placed at the receiving position on the frame towards the order filling position. The articles are controllably advanced on the conveyor by means such as switch means which control the conveyor drive. A moving table is situated adjacent the order filling position on the frame for receiving the transferred articles and enabling the operator to select the desired articles. The table is then moved out of position so that the remaining non-selected articles on the table can be returned to their respective storage bin.

In accordance with the method of the present invention there is contemplated the rapid transfer of articles from their storage position to a central order filling station where the articles can be machine handled and selected, and subsequently quickly restored to their storage bin. In one aspect of the method of this invention the articles are received from their respective storage bins, conveyed to an order filler who selects the articles required for filling the orders, and the remaining non-selected articles are transferred to an intermediate position for return of the articles to their respective storage bins.

The invention will be better understood from the following detailed description taken in conjunction with the accompanying drawings in which:

FIGURE 1 is a plan view of a warehouse for storing steel stock such as utilized in the steel industry;

FIGURE 2 is a fragmentary elevational view illustrating a number of storage racks for storing the steel stock;

FIGURE 3 is a fragmentary perspective view of an individual rack storing a particular stock within a trough supported on the rack;

FIGURE 4 is a fragmentary elevational view illustrating the manner of storage of different types and sizes of stock on the racks;

FIGURE 5 is a schematic view illustrating a hoisting mechanism for transporting the individual troughs containing an item of steel stock;

FIGURE 6 is a plan view illustrating an order filling station constructed according to the principles of the present invention;

FIGURE 7 is an elevational view of the order filling station shown in FIGURE 6 and illustrating a trough containing stock being conveyed to an article pickup position, and a trough in position for return to the storage area;

FIGURE 8 is an elevational view of the order filling station shown in FIGURE 6 and illustrating the stock being conveyed toward a pickup position for filling orders and a trough in position for return of the contained stock to the storage area;

FIGURE 9 illustrates some stock on a vertically movable table adjacent to the order filling pickup position and some stock on a platform in a blocked position until the stock on the movable table has been processed;

FIGURE 10 is a fragmentary view of one section of a platform forming a portion of the order filling station shown in FIGURE 6, and illustrating switch means for controlling the platform rollers conveying the stock to the pickup station;

FIGURE 11 is a fragmentary elevational view of a movable bar utilized in conjunction with the movable table in accordance with one aspect of the present invention;

FIGURE 12 is a fragmentary plan view of the bar mechanism shown in FIGURE 11 and illustrating means for controllably moving the bar in a vertical direction.

Referring now to FIGURE 1 there is illustrated the environment in which the principles of the present invention are especially useful. It must be understood that this environmental description is only for purposes of illustrating and describing one application of the present invention, and no inferences are to be made from this illustration that the present invention is not useful in other environments where relatively large and heavy stock must be selected and transported from a large inventory during order filling operation.

In FIGURE 1 there is illustrated a storage building 10 such as a warehouse enclosing therein a number of storage racks 12 arranged in a rowlike manner so as to form aisles therebetween. These aisles have been indicated by the reference characters A through E in FIGURE 1. The racks 12 positioned on either side of each of the aisles A through E can be individually identified such as indicated in FIGURE 1. On one side of aisle C there is located racks A, B, C, etc. while the racks opposite in aisle C can be identified as F, G, etc. through J.

Each of the racks 12 contains a number of storage bins 14 for storing the stock 16 contained within respective troughs 18 as shown in FIGURES 3 and 4. For purposes of the present illustration, the stock generally consists of steel bars, rods, etc. of varying lengths and cross sections. For order filling purposes it is desired that the different types of stock not be mixed so that each trough 18 will contain only one type of stock, although the individual pieces therein may be of different lengths.

At an easily accessible portion of the warehouse 10 there is located an order filling station 20 where the orders for various types and lengths of the steel stock 16 are filled. To convey the particular stock desired to the order filling station any of the conventional apparatus readily available for this function can be utilized. For example, fork-type lift trucks can be operated to remove the selected trough from its storage rack and transport it to the order filling station. In the illustration shown in FIGURE 5, a conventional hoist mechanism 22 is supported by stationary tracks 24 and 26 mounted respectively to the walls 28 and 30 of building 10. A moving track 32 is movably mounted by a suitable means 34 such that the hoist mechanism can traverse the length of tracks 24 and 26 from wall 36 to wall 38 of building 10. Support apparatus 40 enables the hoist mechanism 22 to traverse the length of moving track 32 between wall 28 and wall 30. A fork like member 42 is rigidly attached to a telescoping support arm 44 and well known means are utilized for selectively rotating the fork like member through 360° and vertically positioning such member by suitably collapsing or extending the telescoping support arm 44.

Using the hoist mechanism 22 schematically illustrated in FIGURE 5, the hoist is operated so as to position it in the aisle and at the particular rack and storage bin where the desired stock is located. The exact location for each type of stock can be easily determined since every stock item is given an isle, rack, and storage bin identification number. For instance, the stock in the troughs 18 shown in FIGURE 2 can be identified as being in aisle A, rack A, storage bin numbers 2 and 3 (the storage bins 14 are numbered from top to bottom). The trough containing the particular stock desired can be easily obtained from its respective rack in the storage area by means of hoist mechanism 22 and transported to the order filling station 20 where the operator will fill the order. At the order filling station, the operator selects the desired number of pieces of stock so as to make up the ordered length. The selected stock is then weighed and bound together for shipment to the customer.

With reference to FIGURE 6 there is illustrated an order filling station 20 constructed in accordance with the principles of the present invention. The order filling station 20 includes a frame 50 with a power driven conveyor 52 extending from the receiving position 54 to a moving table 56. The moving table 56 is movably mounted to the frame 50 intermediate the power driven conveyor 52 and an article pickup position 58. At the article pickup position 58 the desired number of pieces of stock 16 are selected by the operator so as to fill the order. An operator is situated at one end 60 of the frame 50 to operate a control console 62 to coordinate movements of stock 16 as it traverses along the conveyor 52 and moving table 56 to the article pickup position 58. Opposite to the frame end 60 there is provided a helper's position 64 so that the pieces of stock or articles can be selected, weighed, measured, bound together and transferred to the shipping portion 66 for eventual shipment to the customer with the helper assisting the operator during these operations.

In operation, the selected trough 18 containing the desired stock 16 is transferred by means such as the hoist mechanism 22 illustrated in FIGURE 5 from the storage area to the order filling station 20 and is placed on the conveyor 52 at the receiving position 54. Conveyor 52 includes two banks of driven rollers 68, one bank extending from rollers 68a to 68b, and the other bank extending from rollers 68c through 68d. Each of the rollers 68 are rotatingly mounted at one end to bracket 70.

Each bank of rollers 68 forming the conveyor 52 is driven by separate power means. A motor 72 mounted on frame 50 below the conveyor 52 drives a chain and sprocket assembly 74 which is coupled to rollers 68a through 68b. A cover piece 76 provides end support for the rollers, and covers the chain and sprocket assembly 74. A similar motor and drive mechanism is utilized to drive the second bank of rollers 68c through 68d.

The moving table 56 includes a double set of power driven rollers 77 and 78. A motor 80 is mounted on the moving table 56 below a cover plate 82 and through suitable coupling means 84 drives the rollers 77 and 78 simultaneously either towards the article pickup position 58 or in a direction towards the conveyor 52.

As shown in FIGURE 6 a plunger switch 86 is mounted to the frame 50 immediately after roller 68a. The switch 86 is coupled to the motor 72 so that placing of the selected trough 18 upon the conveyor 52 at the receiving position 54 actuates the switch 86 and operates the motor 72 to rotate the first bank of rollers 68a through 68b in a conveying direction towards the moving table 56. Reference may also be had to FIGURE 10 wherein there is illustrated in detail the plunger switch 86 having a contact arm 88 which protrudes slightly above imaginary plane tangent to the top surfaces of rollers 68a through 68b. Operation of the motor 72 moves the trough 18 along the conveyor 52.

A roller type switch 90 is mounted adjacent to the bracket 70 and before roller 68c to actuate the second bank of rollers 68c through 68d. In the fragmentary view of FIGURE 10, the switch 90 is illustrated as including an arm 92 protruding above the tap of the conveyor 52 and having at one end thereof a roller 94 rotatably mounted to the arm 92. The switch 90 is a conventional type of switch in which the arm 92 is spring loaded in the up position. Depression of the arm 92 by an object such as the trough 18 being moved along the conveyor 52 will actuate the switch. The roller 94 is provided to enable the trough 18 to readily pass over the switch 90 as is well known in the art. Actuation of the switch 90 operates a corresponding motor arrangement mounted to the frame 50 similar to the motor 72 and coupling means 74 for driving the second bank of rollers 68c through 68d.

Further along the conveyor 52 and on either side thereof, there is mounted a pair of limit switches 96 and 98, similar in construction to the switch 90. These switches 96 and 98 are independently coupled to the motor 72 such that actuation of either of these switches will decouple the power input to the motor 72 so as to stop rotation of the first bank of rollers 68a through 68b. A similar limit switch 100 is coupled to the motor driving rollers 68c through 68d to stop these rollers from rotating when a trough 18 has been conveyed towards the end of conveyor 52.

In summary, placing of a trough 18 at the receiving position 54 actuates switch 86 to operate motor 72 and thereby rotate the rollers 68a and 68b to advance the trough 18 along the conveyor 52. Upon actuation of switch 90 the second bank of rollers 68c through 68d is rotated and the trough continues to be driven along the conveyor. Actuation of the limit switches 96 and 98 serves to stop rotation of the first bank of rollers 68a through 68b. The trough 18 continues to move along the conveyor 52 until switch 100 is actuated and the trough 18 is butted vigorously against a pair of stop bars 102 movably mounted on either end of conveyor 52. The abrupt stopping of the trough 18 serves to agitate and align the stock 16 within the trough 18 so as to aid in further processing.

When the operator desires to move the trough 18 from the conveyor 52 onto the conveyors 77 and 78 on the movable table 56, he operates a suitable switch in the control console 62 to override the action of switch 100 on conveyor 52. If the moving table 56 is in its uppermost position in alignment with conveyor 58 (as shown in FIGURE 8) the stop bar 102 is below the level of conveyor 52. Thus, when the operator overrides the switch 100 the bank of rollers 68c through 68d are rotated in the direction towards the moving table 56 so as to convey the trough 18 from the conveyor 52 to the moving table 56. A switch 104 similar to switch 90 is mounted to the moving table 56 adjacent conveyors 77 and is coupled to motor 80. Movement of the trough 18 thus actuates switch 104 and operates the motor 80 to rotate the conveyors 77 and 78 and convey the trough 18 towards the article pickup position 58. As the trough 18 moves towards the end of the moving table 56 it actuates a switch 106 to stop the movement of conveyors 77 and 78.

The movable table 56 is supported by a pair of conventional scissor support arms 108 which are moved with respect to each other by well known hydraulic means 110. The operator via control console 62 can operate the hydraulic means 110 so as to control the position of the movable table 56 from its uppermost position to its lowered position illustrated by the dash lines in FIGURE 8. After the operator has selected the stock and placed them at the article pickup position 58, the trough 18 is ready to be returned to the storage area. The operator lowers the tray 56 to its lowermost position and operates a reversing switch located on console 62 which overrides the limit switch 106 and reverses the direction or rotation of conveyors 77 and 78. The trough 18 is then conveyed to a gravity operated conveyor 112 and the trough is moved by gravity on the conveyor 112 to a stop 114. As shown in FIGURE 8 the hoist mechanism 22 may then be positioned to pick up the trough 18 and transport it back to its proper rack position in the storage area.

As shown by the detailed view of FIGURE 9, downward movement of the table 56 releases a pawl 116 from a weight arm 118 to enable a weight 120 to fall and thereby drive the stop bar 102 upwards to a blocking position above the level of conveyor 52. This prevents the trays 18 from undesirably moving off the last bank of rollers 68c through 68d when the table 56 is in the downward position. This is an added safety arrangement since the actuation of limit switch 100 should have stopped rollers 68c through 68d to stop movement of the trough 18. After the used troughs 18 have been rolled onto gravity conveyor 112 the table 56 is raised by hydraulic means 110 to its upper position as shown in FIGURE 8. Upward movement of the table 56 enables an edge 122 to contact the pawl 116 pivoting on pin 124. As the pawl 116 is driven in an upward direction it reacts on a portion of the weight arm 118 so as to move the weight 120 in a clockwise direction and thereby drive the stop bar 102 in a downward direction thereby unblocking the trough 18 resting on the conveyor 52. As soon as the table 56 is in position and the operator desires to move the trough 18 to the article pickup position 58 he may operate a switch in console 62 which overrides the action of limit switch 100 on conveyor 52. This enables rollers 68c through 68d to be rotated in a conveying direction towards the table 56 thereby moving the trough 18 onto the table. As the trough continues to move onto the table, it will actuate switch 104 which is identical in type to roller switch 90. Actuation of switch 104 operates at table motor 80 to simultaneously drive table rollers 77 and 78 in a conveying direction towards the pickup position 58. The trough will continue its movement until it actuates limit switch 106 which then abruptly stops the table rollers to position trough 18 immediately adjacent the article pickup position.

The operator at frame end 60 and a helper at helper's position 64 select certain pieces of stock 16 which has been conveyed adjacent the article pickup position 58, and place the selected stock on platform 126. On the surface of platform 126 along the extended arms 128 and 130 there is positioned a measuring tape 132 to enable the operator to readily determine when the proper number of pieces of stock have been selected from the trough 18 to complete the respective order. The helper at position 64 moves the end of the stock 16 at his position against a backstop 134 and the respective lengths can be read off by the operator from the measuring tape 132. The selected pieces of stock 16 are then transferred to the weighing and shipping portion 66. The shipping portion 66 is part of a scale mechanism so that the operator can obtain a weight reading of the entire order or any portion thereof by viewing the weight indicator 136. The stock transferred to the shipping portion 66 can then be bundled in readiness for shipment to the customer, or the stock may be transferred to a central binding area. Angle rollers 138 on either side of a flat roller 140 have been provided to enable the stock 16 to be readily removed from the shipping portion 66.

In general, most of the types of stock ordinarily encountered are sufficiently light in weight to enable the operator and the helper to lift the stock 16 out of the trough 18 for placement on the platform 126. At times however, rather heavy stock will be encountered, such as large diameter steel rods, and lifting of such stock out of trough 18 may be impossible or at least there may be a high risk of injury to the operator and his helper. It is in these situations that another aspect of the invention is especially useful.

Referring to FIGURES 6, 11 and 12 there is shown a pair of stripper bars 142 mounted to the frame 50 immediately adjacent the article pickup position 58 and on either side of the table 56. The stripper bars 142 are mounted to separate driving chains 144 by means of two pins 146 coupled through the lower portion of the stripper bar 142 and the chain 144. The chain 144 for each stripper bar is coupled around an upper sprocket 147 and a lower driven sprocket 148. The lower sprocket 148 is rigidly mounted on a drive shaft 150 which in turn is driven by a suitable motor and coupling means 152. The stripper bar drive is arranged such that the bars 142 operate in a simultaneous manner and are always in the same relative position with respect to the table 56 and the platform 126.

Referring to FIGURE 12 there is shown a rigid enclosure 154 through which the shaft 150 is rotatingly mounted. The enclosure 154 includes a pair of guide walls 156 on each side of the stripper bars 142 for guiding the bar in its vertical movements. A pair of rollers 158 are rotatingly mounted to a rigid wing portion 160 of the stripper bar 142, and include an indented portion 162 which rides along the outer edge of the guide walls 156. A pair of brackets 164 are rigidly mounted to one wall of the frame 50 immediately adjacent each of the stripper bars 142 to guide the free end of the bars during vertical movements.

In using the stripper bars 142, the operator lowers the position of the table 56 and raises the stripper bars 142 to lift the stock 16 from the trough 18 resting on the table 56 immediately adjacent the article pickup position 58, as indicated in FIGURE 11. The operator adjusts the position of the table 56 such that the top of the trough 18 is immediately below the level of platform 126 at the article pickup position 58. The position of the stripper bar 142 is adjusted by the operator until an end 166 is substantially level with the platform 126 as shown in FIGURE 11. It may be noted that a portion 168 of the top surface of the stripper bar 142 is formed with a slight incline such that the stock 16 will be gently urged to move from the free end of the stripper bar 142 towards the article pickup position 58. As mentioned previously the stripper bars 142 generally need only be utilized for lifting relatively heavy stock from the trough 18. However, if desired the stripper bars 142 can be utilized for selection of all stock sizes, depending on the operator's preference.

As mentioned previously, the present description has been described in connection with the processing of steel stock; however, it is not to be implied that the use of this invention is limited only to this environment, since the teachings herein can be similarly applied to the order processing of aluminum stock or whenever a relatively heavy stock item is to be transported and selected from a large number of different types and sizes of stock. Furthermore, instead of the illustrated rollers, any other type of conveying arrangement which is well known in the art, such as flat moving platforms, etc. can be utilized. It is also well within the teachings of the present invention for one skilled in the art to provide drive means for the table 56, the conveyors 52, 77 and 78, and for the stripper bars 142 different than such means as illustrated in the embodiment of this invention.

What is claimed is:

1. Material handling apparatus for transferring articles to an operator so that orders for said articles may be readily filled by the operator, said apparatus comprising:
    a frame including a receiving position for receiving the articles and an article pickup position where the operator fills the orders;
    a power driven conveyor within said frame having one end thereof at said receiving position for receiving the articles, said conveyor adapted for controllably moving the articles from said one end toward the article pickup position;
    a table movably mounted to said frame intermediate said conveyor and said article pickup position for supporting said articles;
    table drive means for moving said table to a first position in communication with said conveyor for transferring said conveyed articles to said table so that orders for said article may be filled by the operator at the pickup position;
    said means subsequently moving said table with the remaining articles to a second position for the return of the remaining articles to storage;
    a pair of stripper bars movably mounted to said frame at said pickup position adjacent said table and on either end thereof; and
    means for controllably lowering said table and raising said stripper bars slightly above the table level so that the articles are supported by said bars, whereby the desired number of articles can be removed by the operator when filling orders.

2. Apparatus as claimed in claim 1, wherein said stripper bars include an upper surface having a slight downward slope towards the pickup position so that said articles tend to move towards the operator at the pickup position.

3. Apparatus as claimed in claim 1, wherein said power driven conveyor includes separate conveyor sections, each of said sections having separate drive means, and switch means associated with each of said respective conveyor sections and coupled to the respective drive means, said switch means mounted to said frame in operative association with the articles on said conveyor for controlling the advance of said articles from one conveyor section to the next.

4. Apparatus as claimed in claim 1, including a stop bar movably mounted to said frame at the other end of said power driven conveyor for controlling the transfer of said articles from the conveyor to said table, said stop bar being in a nonblocking position when the articles are transferred from said conveyor to the table in the first position and adapted for movement to a blocking position to prevent transfer of the articles to the table when the table is in the second position.

5. Apparatus as claimed in claim 1, including measuring means positioned along said article pickup position for measuring the length of articles selected by the operator.

6. Apparatus as claimed in claim 5, further including scale means for measuring and indicating the weight of said selected articles.

7. Material handling apparatus for transferring articles to an operator so that orders for said articles may be readily filled by the operator, said apparatus comprising:
    a frame including a receiving position for receiving the articles and an article pickup position where the operator fills the orders;
    a power driven conveyor within said frame having one end thereof at said receiving position for receiving the articles, said conveyor adapted for controllably moving the articles from said one end toward the article pickup position;
    a table movably mounted to said frame intermediate said conveyor and said article pickup position for supporting said articles, said table including a reversible conveyor in contact with said articles;
    table drive means for moving said table to a first position in communication with said conveyor for transferring said conveyed articles to said table so that orders for said article may be filled by the operator at the pickup position;
    said means subsequently moving said table with the remaining articles to a second position for the return of the remaining articles to storage;
    a second conveyor within said frame in communication with said table in the second table position; and
    means for driving said reversible conveyor in the direction towards said pickup position with said table in the first position for transferring the articles from the power driven conveyor to the pickup position, and for subsequently driving said reversible conveyor in the opposite direction with said table in the second position for transferring the articles from the table to the second conveyor for return of the remaining articles to storage.

8. Apparatus as claimed in claim 7, including a pair of stripper bars movably mounted to said frame at said pickup position adjacent said table and on either end thereof, and means for controllably lowering said table and raising said stripper bars above the table level and substantially level with said pickup position so that the articles are supported by said bars, whereby the desired number of articles can be selected for order filling.

9. Material handling apparatus for transferring articles to an operator so that orders for said articles may be readily filled by the operator, said apparatus comprising:
   a frame including a receiving position for receiving the articles and an article pickup position where the operator fills the orders;
   a power driven conveyor within said frame having one end thereof at said receiving position for receiving the articles, said conveyor adapted for controllably moving the articles from said one end toward the article pickup position;
   a vertically moving conveyor table mounted to said frame intermediate said conveyor and said article pickup position for supporting said articles at said pickup position with said table in an uppermost raised position and for supportedly moving said articles from said pickup position to a second position for the return of the remaining articles to storage with said table in a bottommost lowered position;
   support means operatively connected to said table for supporting said table in parallel movement from said uppermost raised position to said bottommost lowered position;
   said table including first conveyor means operative with said table in said raised position for transferring said conveyed articles to said table so that orders for said articles may be filled by the operator at the pickup position, and second conveyor means operative with said table in said lowered position for transferring said remaining articles from the table for return to storage; and
   table drive means connected to said support means for vertically moving said table in parallel vertical movement between said table raised and lowered positions.

References Cited

UNITED STATES PATENTS 2,981,399  4/1961  Parker _____ 198—20

RICHARD E. AEGERTER, *Primary Examiner.*

U.S. Cl. X.R.

198—20